US008990569B2

(12) United States Patent
Haynes et al.

(10) Patent No.: US 8,990,569 B2
(45) Date of Patent: Mar. 24, 2015

(54) SECURE COMMUNICATION SESSION SETUP

(75) Inventors: Thomas W. Haynes, San Ramon, CA (US); Steven R. Rados, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1517 days.

(21) Appl. No.: 12/327,366

(22) Filed: Dec. 3, 2008

(65) Prior Publication Data

US 2010/0138660 A1   Jun. 3, 2010

(51) Int. Cl.
*H04L 9/32* (2006.01)
*H04L 9/08* (2006.01)
*H04L 29/06* (2006.01)

(52) U.S. Cl.
CPC .............. *H04L 9/083* (2013.01); *H04L 63/061* (2013.01); *H04L 63/0823* (2013.01); *H04L 9/0844* (2013.01); *H04L 9/3263* (2013.01); H04L 2209/76 (2013.01)
USPC ............. 713/171; 713/156; 713/169; 726/12; 380/281; 380/284

(58) Field of Classification Search
CPC .................................................. H04L 2209/76
USPC ....................................................... 713/171
See application file for complete search history.

(56) References Cited

U.S. PATENT DOCUMENTS

| | | | | |
|---|---|---|---|---|
| 7,535,905 B2* | 5/2009 | Narayanan et al. | ........... | 370/392 |
| 7,792,065 B2* | 9/2010 | Jepson et al. | ................. | 370/261 |
| 8,024,560 B1* | 9/2011 | Alten | ............................. | 713/156 |
| 2004/0008666 A1* | 1/2004 | Hardjono | ...................... | 370/352 |
| 2006/0047960 A1* | 3/2006 | Ono et al. | ..................... | 713/171 |
| 2006/0268834 A1* | 11/2006 | Bajic | .............................. | 370/352 |
| 2007/0002833 A1* | 1/2007 | Bajic | .............................. | 370/352 |
| 2007/0101133 A1* | 5/2007 | Liu et al. | ........................ | 713/168 |
| 2007/0124471 A1* | 5/2007 | Harada et al. | ................. | 709/225 |
| 2007/0133803 A1* | 6/2007 | Saito et al. | ..................... | 380/267 |
| 2007/0157027 A1* | 7/2007 | Palekar et al. | ................. | 713/171 |
| 2007/0218924 A1* | 9/2007 | Burman et al. | ............... | 455/466 |
| 2007/0274299 A1* | 11/2007 | Ruckart | ........................ | 370/356 |
| 2008/0022383 A1* | 1/2008 | Bobde et al. | ..................... | 726/10 |
| 2008/0044032 A1* | 2/2008 | Lou et al. | ....................... | 380/284 |
| 2008/0065884 A1* | 3/2008 | Emeott et al. | ................. | 713/168 |
| 2008/0235508 A1* | 9/2008 | Ran et al. | ....................... | 713/151 |
| 2008/0235511 A1* | 9/2008 | O'Brien et al. | ............... | 713/171 |
| 2008/0267407 A1* | 10/2008 | Vanderveen | ................... | 380/277 |
| 2008/0304445 A1* | 12/2008 | Chou | ........................... | 370/329 |
| 2008/0307225 A1* | 12/2008 | Busser et al. | ................. | 713/171 |
| 2008/0310366 A1* | 12/2008 | Oba et al. | ...................... | 370/331 |
| 2009/0019284 A1* | 1/2009 | Cho et al. | ...................... | 713/170 |
| 2009/0043901 A1* | 2/2009 | Mizikovsky et al. | .......... | 709/229 |
| 2009/0080655 A1* | 3/2009 | Nakamura et al. | ............. | 380/255 |
| 2009/0094692 A1* | 4/2009 | Ono et al. | ........................ | 726/11 |
| 2009/0158032 A1* | 6/2009 | Costa et al. | .................... | 713/156 |
| 2009/0222902 A1* | 9/2009 | Bender et al. | ................... | 726/10 |
| 2009/0252309 A1* | 10/2009 | Beyer et al. | ................. | 379/93.02 |
| 2010/0228980 A1* | 9/2010 | Falk et al. | ...................... | 713/171 |

* cited by examiner

*Primary Examiner* — Ashok Patel
*Assistant Examiner* — Gary Gracia

(57) ABSTRACT

A device receives an encrypted key generating value from a first device and decrypts the encrypted key generating value. A temporary session key associated with the first device is generated based on the key generating value. A secure session invitation message is received from the first device. A master session key is generated and encrypted using the temporary session key associated with the first device. The encrypted master session key is transmitted to the first device.

9 Claims, 9 Drawing Sheets

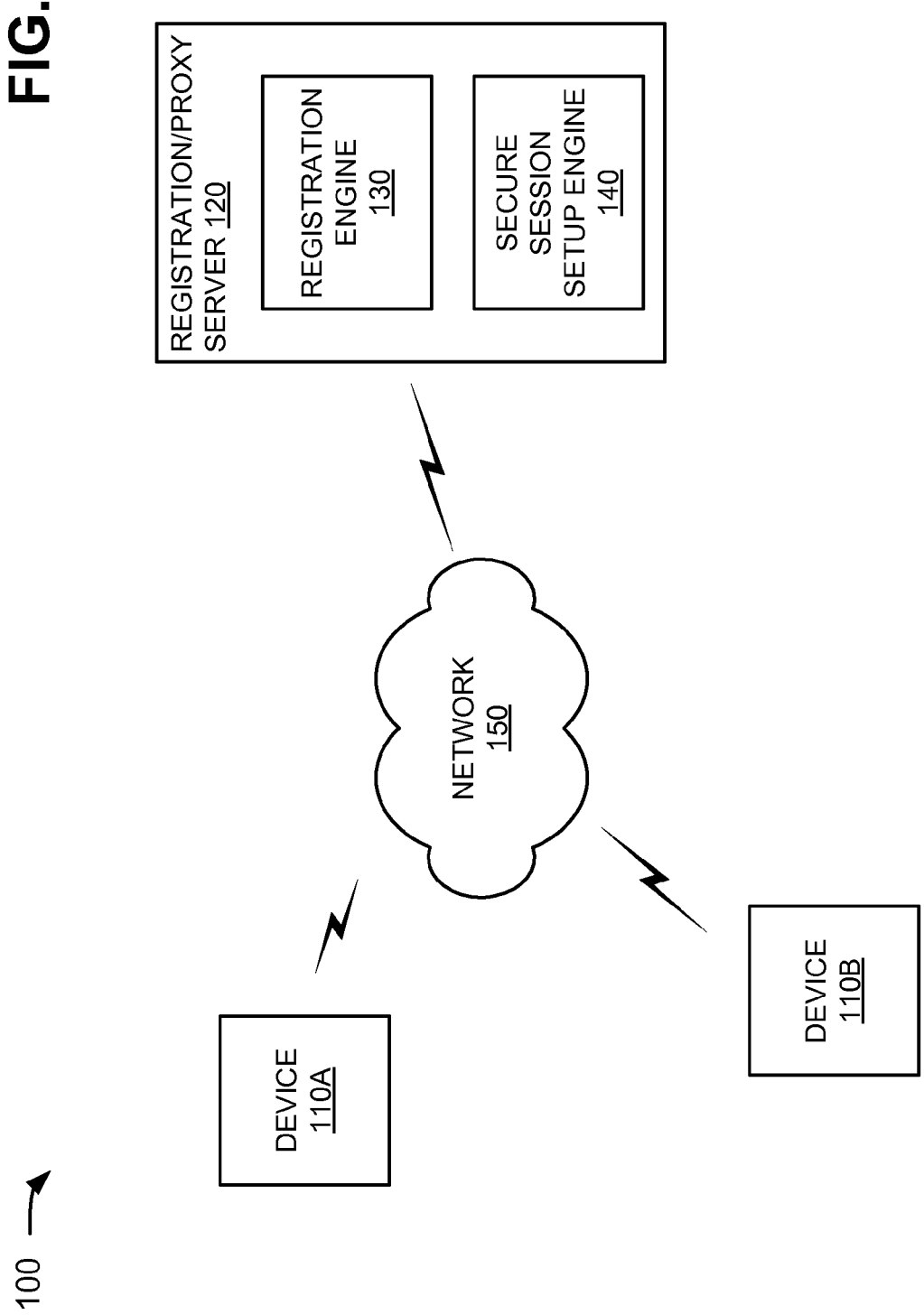

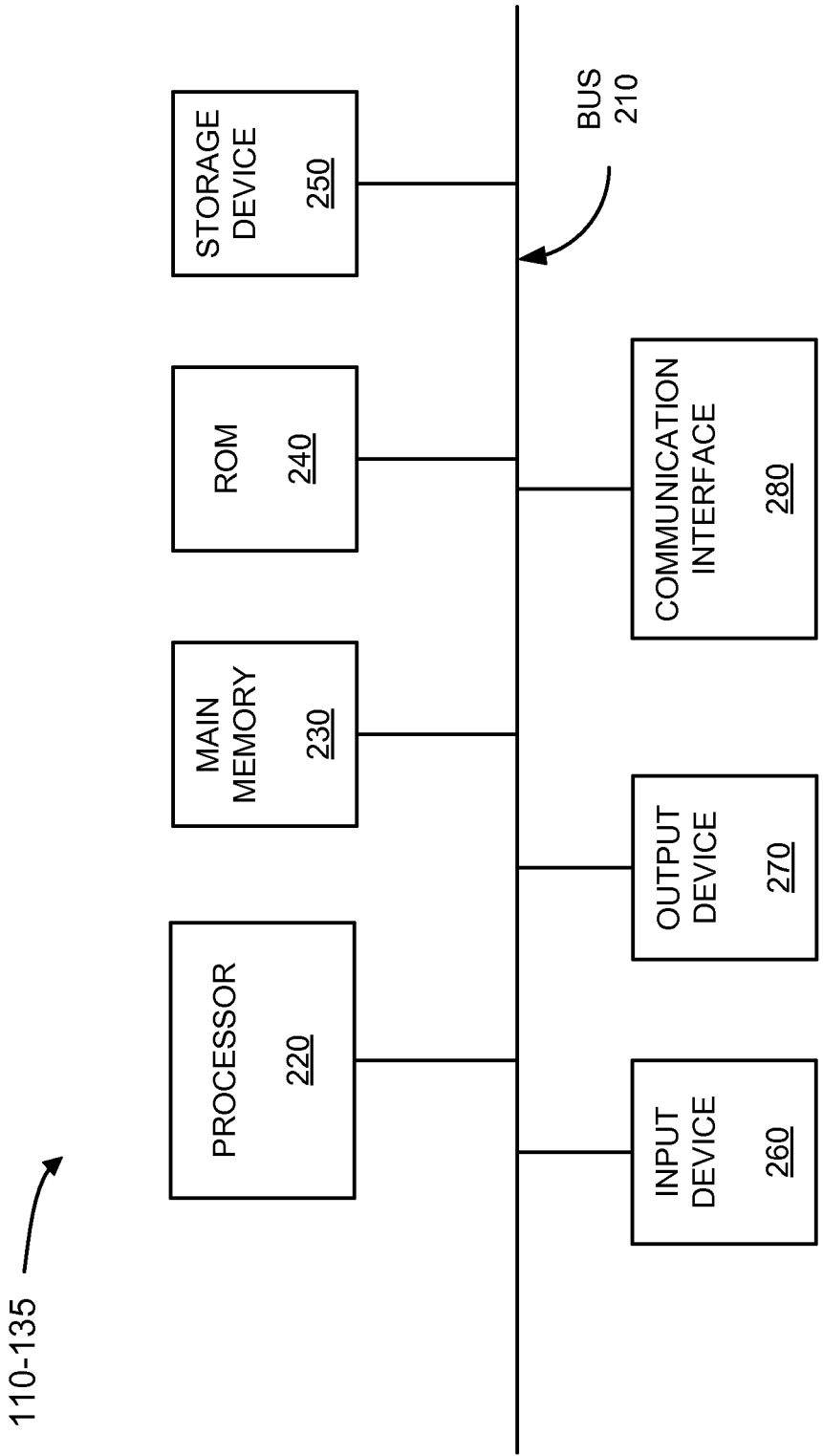

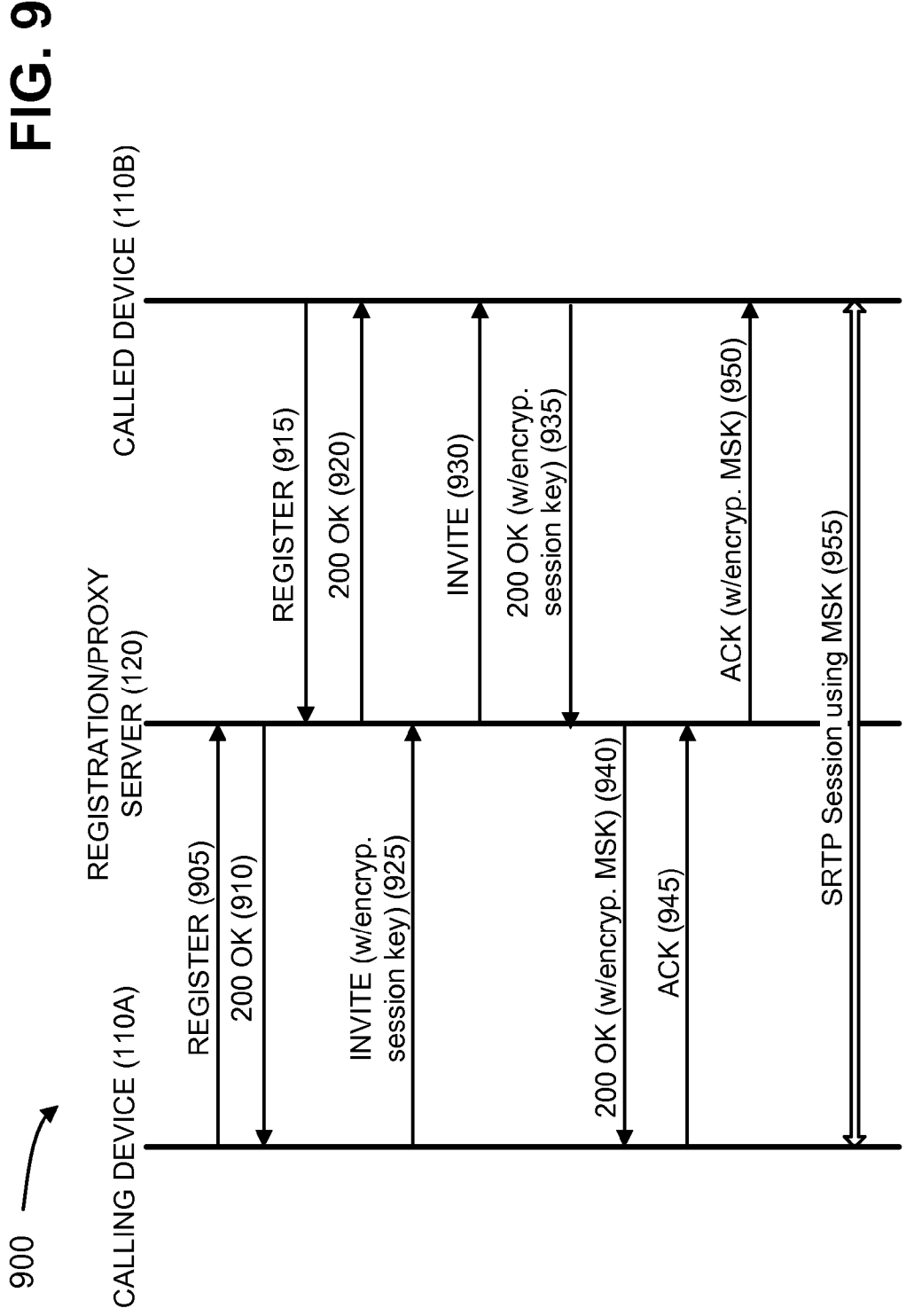

SECURE COMMUNICATION SESSION SETUP

BACKGROUND INFORMATION

Voice over Internet Protocol (VoIP) refers generally to the delivery of voice or other media via a data network, such as the Internet or other packet-switched network. For example, Session Initiation Protocol (SIP) is an application-layer control (i.e., signaling) protocol for creating, modifying, and terminating voice or other data sessions between two or more participants. These sessions may include Internet-based telephone calls, multimedia distribution, multimedia conferences, instant messaging conferences, interactive voice response (IVR) systems, automated and manual operator services, automatic call distribution, call routing, etc.

SIP invitations or INVITES may be used to create sessions and may carry session descriptions that allow participants to agree on a set of compatible media types. SIP may use proxy servers to help route requests to a user's current location, authenticate and authorize users for services, implement provider call-routing policies, and/or provide other features to users. SIP may also provide a registration function that allows users to update their current locations for use by proxy servers.

Challenges exist in providing secure systems for establishing VoIP real time communication sessions. Because sessions typically involve one or more intermediary devices (e.g., proxy servers, session border controllers, firewalls, etc.), it has proven difficult to effectively secure (e.g., encrypt) the data associated with a session while simultaneously ensuring that the secure session will be supported by the underlying network. For example, although tunneling protocols (e.g., Internet Protocol Security (IPsec)) exist for securing data between tunnel endpoints, any established tunnel may effectively mask the type of underlying communication from the operators of the network being used. Although this may be desirable in some circumstances, real time communication sessions typically rely on various quality of service (QoS) guarantees provided by the network. When the type of communication is hidden, such QoS guarantees may not be available, resulting in an unacceptable level of performance for the session. Alternatively, hop-by-hop security protocols (e.g., transport layer security (TLS) and secure sockets layer (SSL)) may be implemented that require data to be decrypted at each hop in a network between session participants. Unfortunately, this requirements substantially impacts both the security of the underlying data as well as the efficiency in which it is delivered.

BRIEF DESCRIPTION OF THE DRAWINGS

FIG. 1 depicts an exemplary network in which systems and methods described herein may be implemented;

FIG. 2 depicts an exemplary device, client or server, configured to communicate via the exemplary network illustrated in FIG. 1;

FIG. 9 is an exemplary call flow illustrating communications between the client devices and registration/proxy server illustrated in FIG. 1 in an alternative embodiment.

DETAILED DESCRIPTION OF PREFERRED EMBODIMENTS

Figure 3B:
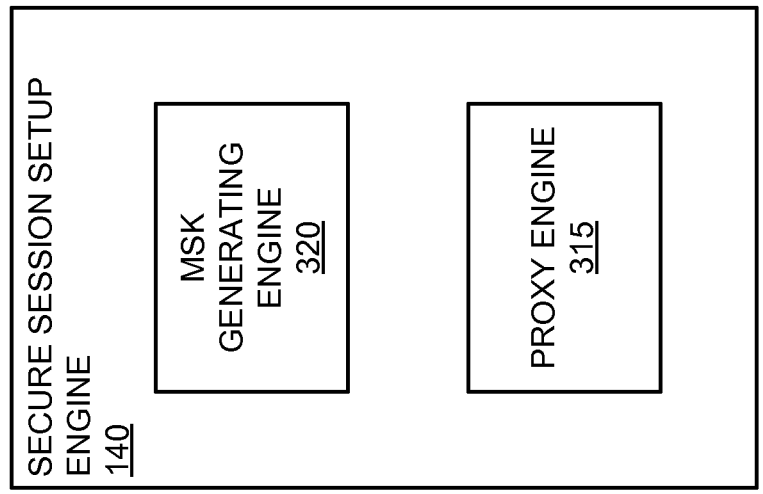
FIGS. 3A and 3B are diagrams of exemplary components of the registration/proxy server illustrated in FIG. 1.

The following detailed description refers to the accompanying drawings. The same reference numbers in different drawings may identify the same or similar elements. Also, the following detailed description does not limit the invention.

Systems and methods described herein may facilitate secure communication between telecommunications devices via a multi-hop or distributed environment. For example, a two-stage key generation and distribution mechanism may be used to ensure that both key generation and key distribution communications are secure, while simultaneously providing transparency with respect to the type of communication session and underlying session requirements associated with a requested communication session.

FIG. 1 depicts an exemplary network 100 in which systems and methods described herein may be implemented. Network 100 may include client devices 110A and 110B (collectively "devices 110" and individually "device 110") connected to multiple servers (e.g., registration/proxy server 120) via a network 150. Although only two client devices 110A and 110B and one server 120 have been illustrated as connected to network 150 for simplicity, in practice, there may be more or fewer devices and servers. Also, in some instances, a client device may perform one or more functions of a server and/or a server may perform one or more functions of a client device.

Network 150 may include a local area network (LAN), a wide area network (WAN), a telephone network, such as the Public Switched Telephone Network (PSTN), an intranet, an Internet Protocol-based network, such as the Internet, a SIP-based network, a VoIP-based network, an IVR (interactive voice response)-based network, or a combination of networks. Devices 110 and server 120 may connect to network 150 via wired, wireless, and/or optical connections.

Devices 110 may include client entities. An entity may be defined as a device, such as a personal computer, a SIP telephone, a wireless telephone, a personal digital assistant (PDA), a lap top, or another type of computation or communication device, a thread or process running on one of these devices, and/or an object executable by one of these devices. In some implementations, devices 110 may include gateway devices configured to connect to other user devices, such as telephones. Alternatively, devices 110 may include user devices directly connected to network 110.

Registration/proxy server 120 (e.g., a SIP server) may include a device that facilitates the registration of devices 110 and the establishment of VoIP calls or communication sessions, or a device that is capable of facilitating SIP-based communications, e.g., Internet-based telephone calls, multimedia distribution, multimedia conferences, instant messaging conferences, IVR, automated and manual operator services, automatic call distribution, call routing, etc.

Registration/proxy server 120 may include a server entity that gathers, processes, searches, and/or maintains applications (e.g., a high-speed, high-capacity packet processing applications server). Registration/proxy server 120 may facilitate the establishment of SIP (or other VoIP-based) calls or other real time communication sessions. As described in the Internet Engineering Task Force (IETF) document RFC 3261, server 120 may act as both a server and a client for the purpose of making requests on behalf of other clients. Requests may be serviced internally or by passing them on, possibly after translation, to other servers or devices. Server 120 may interpret, and, if necessary, rewrite a request message before forwarding it.

As further shown in FIG. 1, registration/proxy server 120 may include a registration engine 130 and a secure session setup engine 140. As set forth in additional detail below, registration engine 130 may be configured to receive secure registration requests from devices 110. Upon receipt of such a request, registration engine 130 in addition to registering or listing information about device 110 in a directory of devices 110, may generate a matching temporary session key (TSK) usable by the device 110 and server 120 for a predetermined duration or until the registering device 110 re-registers with server 120. The TSK may be used to encrypt and decrypt subsequent call-related communications between server 120 and the registering device 110.

Secure session setup engine 140 may be configured to distribute keying information for a particular secure real time communication session using the TSKs associated with the participating devices 110. For example, as will be described in addition detail below, secure session startup engine 140 may, upon receipt of a secure call request between device 110A and device 110B, generate a master session key (MSK) for use during the call. Secure session setup engine 140 may transmit the MSK to each of the participating devices 110 using the previously generated TSKs associated with each device 110. The participating devices may communicate with each other in real time using the distributed MSK to encrypt and decrypt the data exchanged during the communication session.

Unlike conventional secure session architectures, no end-to-end tunnel (e.g., IPSec tunnel) is established between the participating devices. Consequently, a service provider or other monitoring entity may be fully aware of the type of communication being undertaken for the purposes of its own security, billing, and quality-of-service (QoS) requirements. However, the above-described architecture still provides for a secure session by ensuring that all key generation and distribution activities are performed in a secure, encrypted manner and that no keying information is transmitted in the clear.

Although FIG. 1 shows the proxy and registration elements of server 120 being performed by a single device, it should be understood that such an embodiment is merely exemplary and that the proxy and registration elements of server 120 may be performed by separate, distinct devices. Similarly, registration engine 130 and secure session setup engine 140 are illustrated as part of server 120. In other implementations, registration engine 130 and secure session setup engine 140 may be a separate server entities that includes one or more devices that facilitate the registration and setup of secure communication sessions.

Although implementations are described below in the context of SIP and an Internet Protocol (IP)-based network, in other implementations equivalent or analogous communication protocols (e.g., International Telecommunication Union (ITU) H.323) and/or types of transport networks (e.g., asynchronous transfer mode (ATM), frame relay, etc.) may be used. Both the ITU H.323 standard and the IETF's SIP are examples of protocols that may be used for establishing a communications session among terminals, such as devices 110, connected to a network. Although SIP-type messages are shown for convenience, any type of protocol or a mixture of such protocols may be applied in various parts of the overall system.

FIG. 2 is an exemplary diagram of a client device or server entity (hereinafter called "client/server entity"), which may correspond to one or more of client devices 110, registration/proxy server 120, registration engine 130, and/or secure session setup engine 140. The client/server entity may include a bus 210, a processor 220, a main memory 230, a read only memory (ROM) 240, a storage device 250, an input device 260, an output device 270, and a communication interface 280. Bus 210 may include a path that permits communication among the elements of the client/server entity.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information into the client/server entity, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 150.

As will be described in detail below, the device/server entity may perform certain secure session setup and configuration operations. The device/server entity may perform these operations in response to processor 220 executing software instructions contained in a computer-readable medium, such as memory 230. A computer-readable medium may be defined as a physical or logical memory device.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Figure 3A:
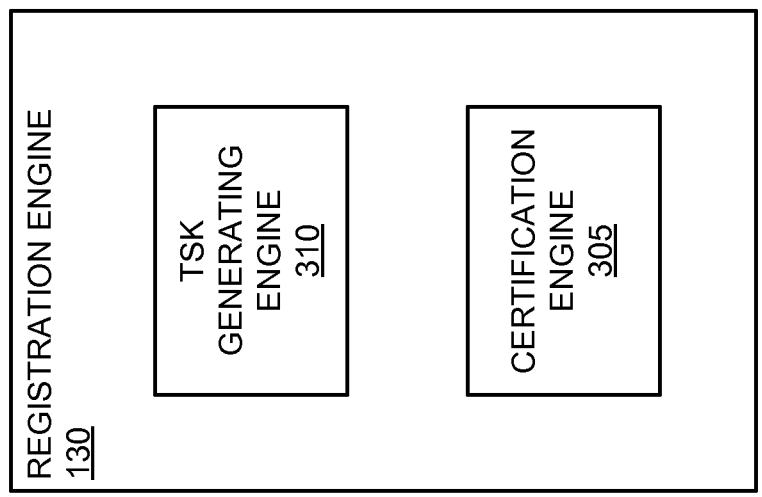

FIG. 3A is a diagram of exemplary functional components of registration engine 130. As illustrated, registration engine 130 may include a certification engine 305 and a temporary session key (TSK) generating engine 310. Certification engine 305 may include circuitry and/or a software system configured to receive a secure registration request from a client device 110. In one exemplary embodiment, the registration request may include device-related information, such as an Internet protocol (IP) address associated with device 110, a uniform resource identifier (URI) associated with device 110 (e.g., the device's "phone number"), and a port number on which device 110 is listening for messages. In one embodiment, information identifying the registration request as a "secure" registration request may be included as a value in a header, e.g. a secure description protocol (SDP) header, of a standard REGISTER message. Specifications for SDP are described in the IETF document RFC 4568.

Registration engine 130 may be further configured to transmit a response to the registration request that includes a digital certificate associated with registration/proxy server 120. As with the initial request, secure elements of the registration response may be included in a header of the standard SIP message. In one implementation consistent with embodiments described herein, the digital certificate may include an encryption key associated with server 120 and may be signed by a trusted third party certification authority. In other implementations, the digital certificate may be "self-signed."

In one exemplary embodiment, the encryption key provided with the digital certificate may be a public key in a public/private key encryption system. In such systems, knowledge of a public key does not enable information encrypted using the public key to be determined. Rather, only the public key's corresponding private key may be used to decrypt the encrypted information. By providing the public key in conjunction with a signed digital certificate, server 120 is effectively authenticating the veracity of the enclosed public key for subsequent use by the receiving device.

TSK generating engine 310 may include circuitry and/or a software system configured to receive an encrypted key generating value from a registering device 110. In one example, the key generating value may include a random or pseudo-random number generated by registering device 110. For example, each registering device 110 may include a random or pseudorandom number generator, configured as either a hardware or software-based device. As with the initial request message exchange, the random or pseudorandom number may be included in a header of a standard SIP message.

Once received, the received encrypted key generating value may be decrypted using the private key associated with registration/proxy server 120. The decrypted key generating value may be used to generate a temporary session key (TSK) associated with the registering device 110. For example, the key generating value may be used as a seed for generating the TSK. The generated TSK may be stored on server 120, e.g., in storage device 250. As will be described in additional detail below, each registering device 110 may similarly generate a matching TSK based on its exchanged key generating value. In this manner, following key generating value exchange, registering device 110 and server 120 each possess an identical TSK for use in establishing subsequent secure communication sessions.

Although FIG. 3A shows exemplary components of registration engine 130, in other implementations registration engine 130 may contain additional components that may enable secure registration of devices 110 with server 120. In still other implementations, one or more components of registration engine 130 may perform the tasks performed by other components of registration engine 130.

FIG. 3B is a diagram of exemplary functional components of secure session setup engine 140. As illustrated, secure session setup engine 140 may include a proxy engine 315 and a master session key (MSK) generating engine 320. Proxy engine 315 may include a SIP proxy including a device or software system configured to facilitate the establishment of a secure communication session. As described in the Internet Engineering Task Force (IETF) document RFC 3261, server 120 may act as both a server and a client for the purpose of making requests on behalf of other clients. Requests may be serviced internally or by passing them on, possibly after translation, to other servers. Server 120 may interpret, and, if necessary, rewrite a request message before forwarding it. In particular, proxy engine 315 may be configured to receive and respond to session initiation (e.g., INVITE) requests from a calling device 110 (e.g., device 110A), requesting the establishment of a communication session with a called device 110 (e.g., device 110B). For example, proxy engine 315 may receive an INVITE message designating a URI associated with a called device. Proxy engine 315 may map the URI to the IP address associated with the called device (received during device registration) and may modify the INVITE message to designate the identified IP address.

MSK generating engine 320 may include circuitry and/or a software system configured to generate a MSK associated with the requested communication session. For example, MSK generating engine 320 may be configured to, in response to a received INVITE message, generate a MSK and encrypt the generated MSK using the TSK associated with the called device 110B. The encrypted MSK may be inserted into a header of the INVITE message and the modified INVITE message may be forwarded to the called device 110B.

If server 120 receives a message from called device 110B indicating that called device 110B has accepted the call (e.g., a 200 OK message), MSK generating engine 320 may be configured to encrypt the generated MSK using the TSK associated with the calling device 110A. The encrypted MSK may be inserted into a header of the acceptance message and the modified message may be forwarded to the calling device 110A.

Both calling device 110A and called device 110B may decrypt the encrypted MSKs included in their respective messages using their respective TSKs. At this point, both calling device 110A and called device 110B possess the decrypted MSK generated by server 120. The MSK may be used to encrypt the real time exchange of data between calling party 110A and calling party 11B using, for example, the secure real time protocol (SRTP).

Because all keying information is exchanged in a secure manner (e.g., the key generating values for generating the TSKs are exchanged, for example, using a public key infrastructure, and the MSK is exchanged using the shared private TSKs), the above-described system facilitates a secure communication session between two or more devices.

Although FIG. 3B shows exemplary components of secure session setup engine 140, in other implementations secure session setup engine 140 may contain additional components that facilitate secure session setup between two or more devices 110. In still other implementations, one or more components of secure session setup engine 140 may perform the tasks performed by other components of secure session setup engine 140.

Figure 4:
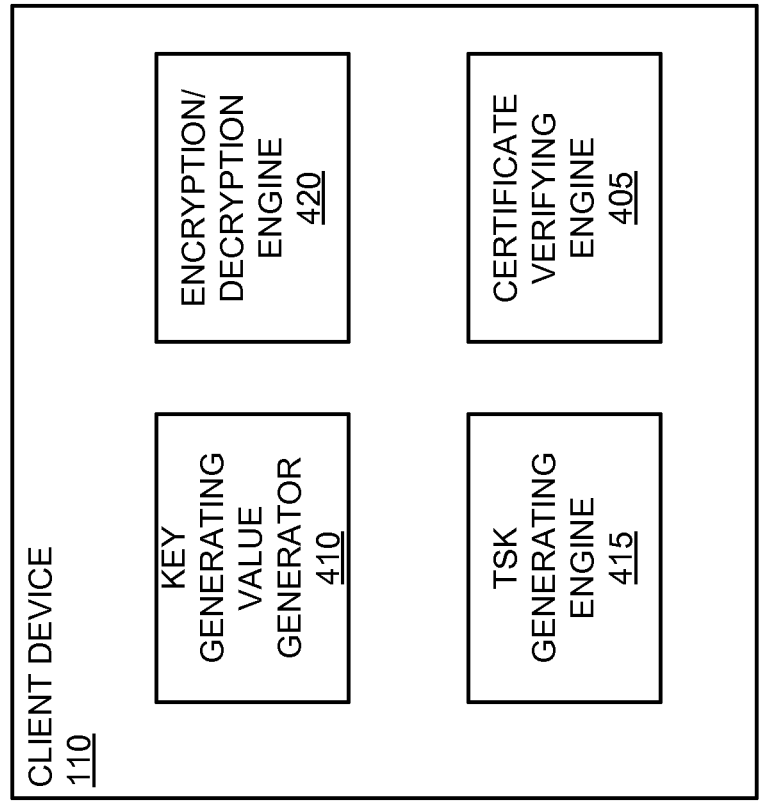
FIG. 4 is a diagram of exemplary components of the client devices of FIG. 1.

FIG. 4 is a diagram of exemplary functional components of client device 110. As illustrated, client device 110 may include a certificate verifying engine 405, a key generating value generator 410, a TSK generating engine 415, and an encryption/decryption engine 420. Certificate verifying engine 410 may include circuitry and/or a software system configured to receive the digital certificate from server 120 and to authenticate the digital certificate, e.g., with the third party authority. In one implementation, certificate verifying engine 405 may be further configured to extract server 120's public key from the digital certificate.

Key generating value generator 410 may include circuitry and/or a software system configured to generate a seed value used to generate or create a TSK. As described above, in some implementations, key generating value generator 410 may include a random or pseudorandom number generator for generating an unpredictable (or essentially unpredictable) seed value for generating a TSK.

Upon generation of the key generating value, encryption/decryption engine 420 may be configured to encrypt the key generating value using server 120's public key, as extracted from the received digital certificate. As described above, server 120 may transmit the encrypted key generating value to server 120, e.g., in a header of a SIP message.

TSK generating engine 415 may include circuitry and/or a software system configured to generate a TSK associated with the registering device based on the key generating value generated by key generating value generator 410. The generated TSK may be stored on device 110, e.g., in storage device 250.

When client device 110 is a session initiating device (e.g., the calling device 110A), client device 110A may be configured to send an INVITE (or similar) message to server 120 designating another client device 110 as the called party (e.g., device 110B). As discussed briefly above, upon acceptance of the session by the called party, client device 10A may receive an acceptance message (e.g., a 200 OK message) from server 120 that includes an encrypted MSK for the subsequent real time session. Encryption/decryption engine 420 may be configured to decrypt the MSK using the TSK generated by TSK generating engine 415. Client device 110A may use the decrypted MSK as a shared encryption/decryption key with the called party device 110B during the subsequent real time communication session. As discussed above, the real time session may be an SRTP session.

When client device 110 is a called party device (e.g., called device 110B), client device 10B may be configured to receive the modified INVITE (or similar) message from server 120 including the setup specifics of the session as well as the encrypted MSK for use in the subsequent real time session. If client device 110B accepts the session, client device 110B may be configured to transmit an acceptance message (e.g., a 200 OK message) to server 120. Once the MSK has been successfully transmitted to client device 110A, client device 110B may use the decrypted MSK as a shared encryption/decryption key with the called party device 110A during the subsequent real time communication session.

Although FIG. 4 shows exemplary components of client devices 110, in other implementations devices 110 may contain additional components that facilitate secure communication with another device 110. In still other implementations, one or more components of device 110 may perform the tasks performed by other components of device 110.

Figure 5:
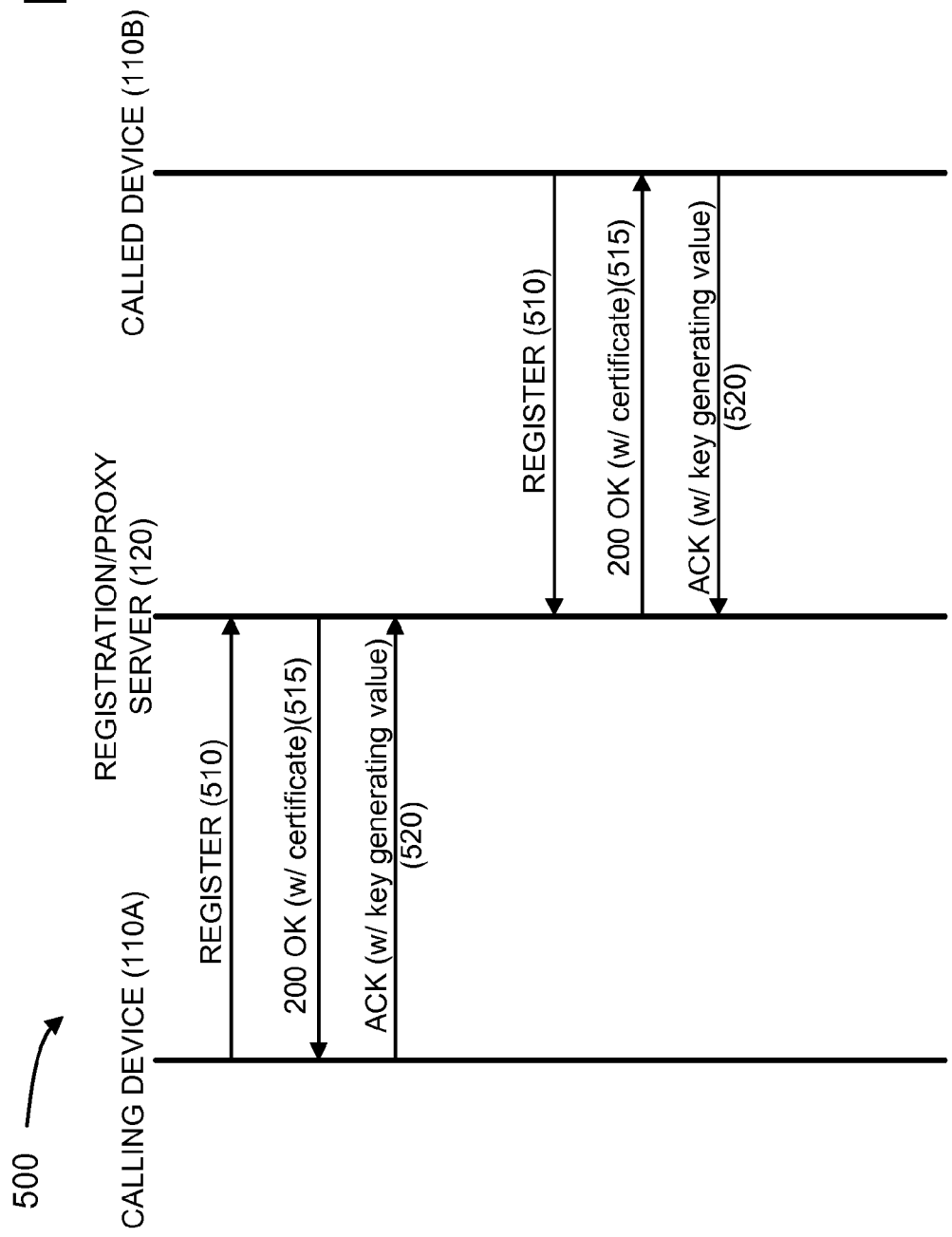
FIGS. 5 and 6 are exemplary call flow diagrams illustrating communications between the client devices and the registration/proxy server illustrated in FIG. 1.

FIG. 5 is an exemplary call flow 500 between calling device 110A, registration/proxy server 120, and called device 110B during the above-described registration of devices 110. Call flow 500 may depict exemplary steps registering each of devices 110A and 110B with server 120 for subsequent secure communication session setup. As shown, registration/proxy server 120 may receive a REGISTER request 510 that designates the request as being a request for secure registration. Although call flow 500 describes a single REGISTER request message 510, other implementations may incorporate multiple messages, with an initial, conventional REGISTER message and registration process, followed by a subsequent request for secure registration.

Upon receipt of REGISTER message 510 designating secure registration, registration/proxy server 120 may respond with a "200 OK" or other responsive message 515 indicating receipt of REGISTER message 510. 200 OK message 515 may include a digital certificate associated with server 120. As described above, the digital certificate may include an encryption key (e.g., a public key in a PKI (pubic key infrastructure) system) associated with server 120 and may be signed by a trusted third party certification authority. As described briefly above, the digital certificate may be included in one or more header fields of message 515.

Client device 110A may, upon receipt of 200 OK message 515 including the digital certificate, verify the authenticity of the certificate and extract the encryption key from the digital certificate. Client device 110A may generate a key generating value (e.g., with key value generating generator 410). Client device 110A may encrypt the key generating value and may transmit an ACK or similar message 520 to server 120 that includes the encrypted key generating value. As described briefly above, the key generating value may be included in a field in the header of message 520.

Upon receipt of message 520 including the encrypted key generating value, server 120 may decrypt the key generating value and may generate a temporary session key (TSK) using the decrypted value. Client device 110A may also independently generate an identical temporary session key (TSK) using the key generating value. The generated TSKs will be used as shared secret keys by both device 110A and server 120 during setup of a subsequent secure communication session.

As illustrated in FIG. 5, device 110B may register with server 120 using a similar sequence of messages and operations. In one implementation, registration of devices 110 may occur at predetermined intervals (e.g., 30 minutes, 1 hour, etc.) balancing load time on server 120 with the need to periodically update registration information for connected devices 110. Alternatively, device registration may occur once for each power-up or boot of devices 110. Regardless of frequency, each registration of device 110A (or 110B) may result in a new TSK being generated.

Figure 6:
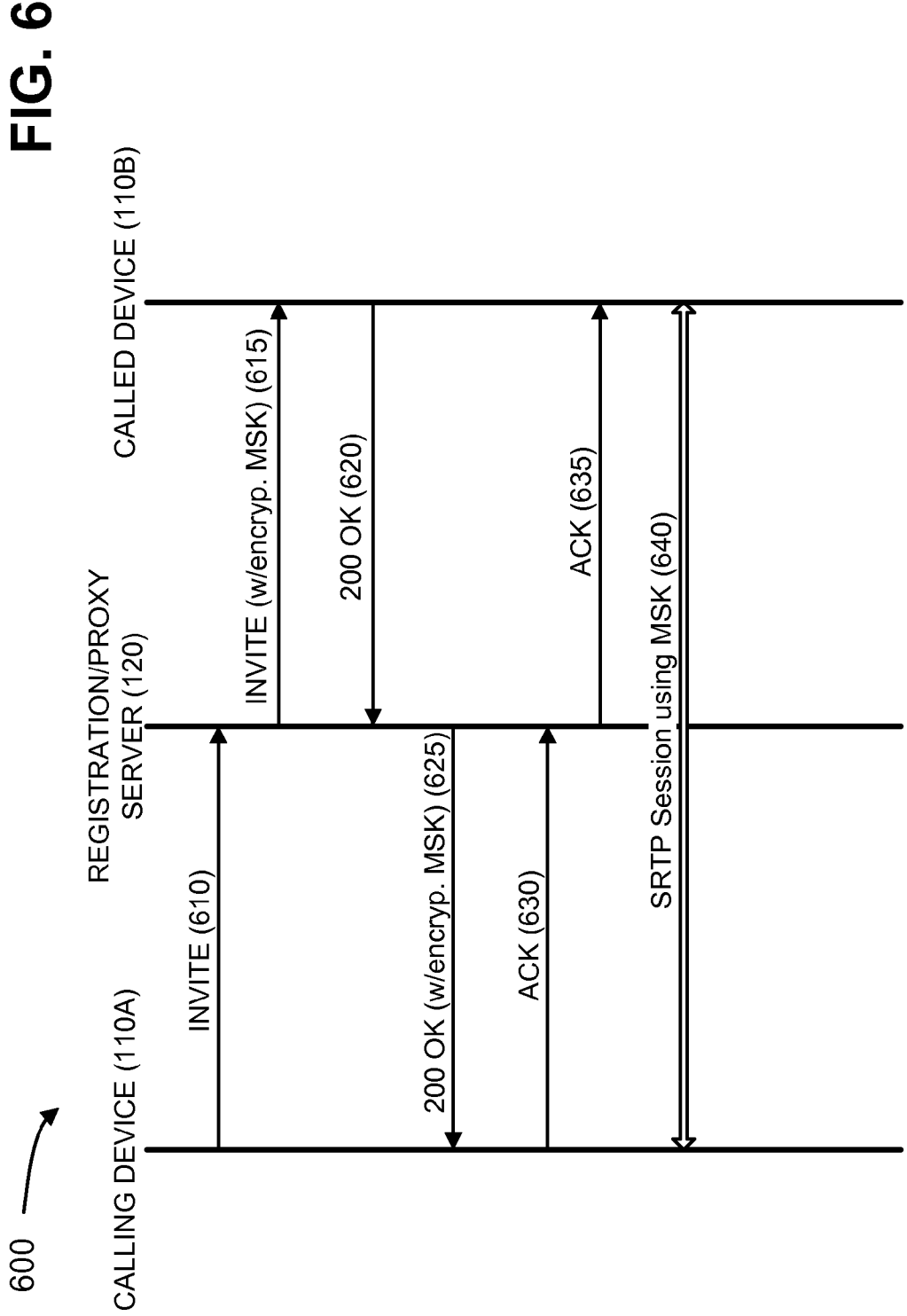

FIG. 6 is an exemplary call flow 600 between calling device 110A, registration/proxy server 120, and called device 110B during the above-described setup of a secure communication session between device 110A and device 110B. As shown, registration/proxy server 120 may receive an INVITE message 610 from calling device 110A. As described above, INVITE message 610 may designate that the request is for a secure call or session (e.g., by including a predetermined value in a header of INVITE message 610). As described above, proxy server-based communications systems (e.g., SIP, H.323, etc.) rely on the registration of connected devices with a proxy server to ensure that calls to such devices are accurately routed, regardless of the actual location or network associated with the called or calling device. In this manner, INVITE message 610 may designate a "number" (e.g., a URI) associated with called party 110B and an IP address associated with server 120.

Upon receipt of INVITE message 610 and recognition of the secure designation, registration/proxy server 120 may look up the IP address (as well as additional session setup information) associated with the called device 110B. Server 120 may generate a master session key (MSK) for use in a potential secure communication session between device 110A and device 110B and may encrypt the MSK using the TSK associated with device 110B. Server 120 may rewrite the header of INVITE message 610 to designate the identified IP address of called device 110B, replace the IP address of calling device 110A with the IP address of server 120, as well as to include the encrypted MSK.

Server 120 may transmit modified INVITE message 615 to called device 110B. Upon receipt of INVITE message 615, called device 110B may, upon acceptance of the call/session setup, decrypt the MSK using its TSK and may transmit a 200 OK message 620 to server 120, thus indicating that the session invitation has been accepted.

Upon receipt of 200 OK message 620, registration/proxy server 120 may look up the IP address associated with the calling device 110A. This information may be retrieved from a database of device information, or may be retrieved from the INVITE message previously received. Server 120 may encrypt the previously generated MSK using the TSK associated with device 110A and may rewrite the header of 200 OK message 620 to designate the identified IP address of calling device 110A as well as to include the encrypted MSK.

Server 120 may transmit modified 200 OK message 625 to calling device 110A. Upon receipt of 200 OK message 625, calling device 110A may decrypt the MSK using its TSK and may transmit a ACK message 630 to server 120, thus indicating that the session invitation has been accepted. Server 120 may rewrite ACK message 630 according to the known IP address of called device 110B and may transmit the modified ACK message 635 to device 110B. Devices 110A and 110B may now conduct the secure real time media session (640) (e.g., via SRTP), using the MSK provided by server 120 as a shared private encryption/decryption key.

By provide for the secure generation and exchange of encryption keys and keying information, while simultaneously maintaining a transparency relating to the type of communication being requested/performed, the above system is capable of effectively and efficiently securing VoIP-based real time communication sessions.

Figure 7:
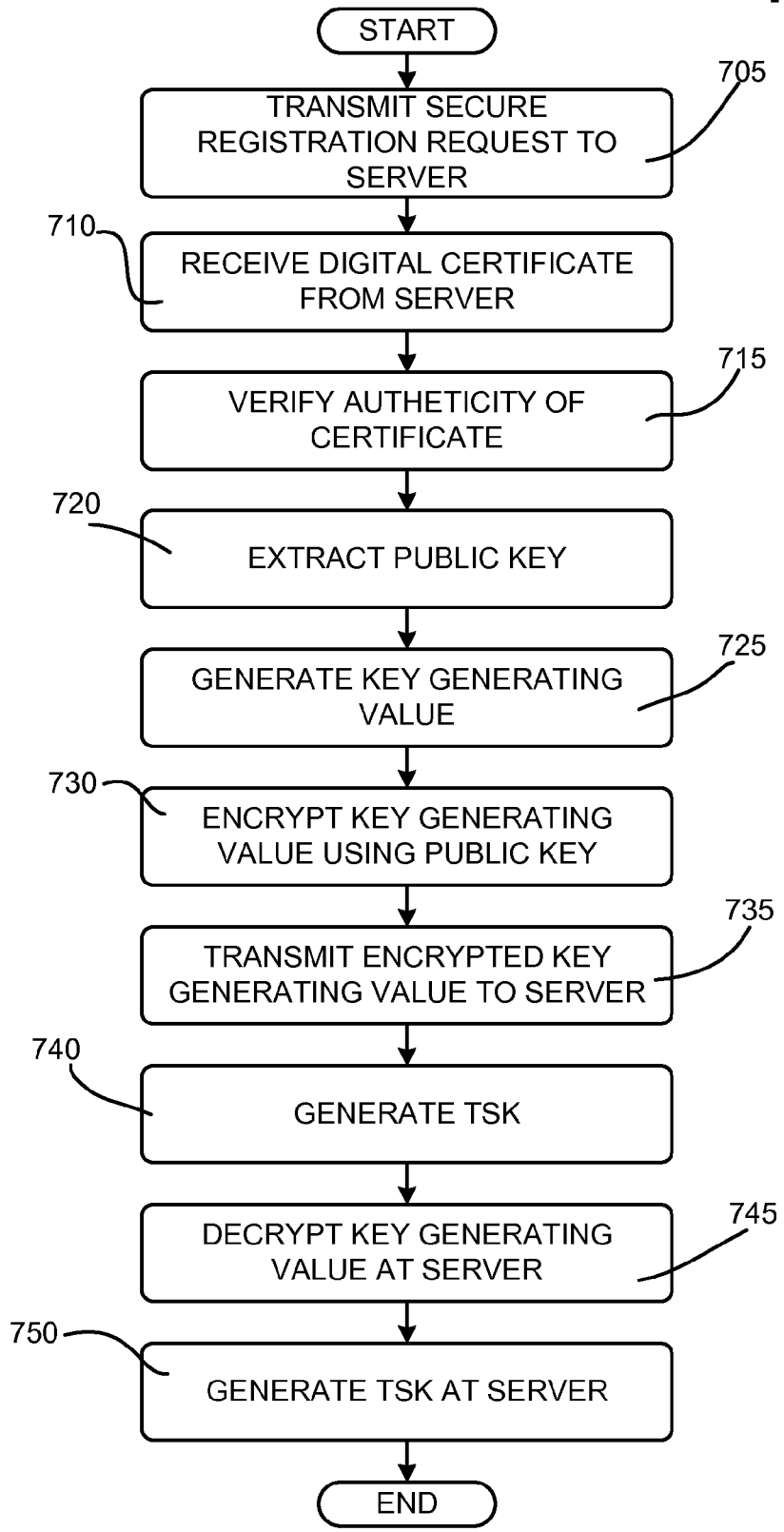
FIGS. 7 and 8 are flowcharts of exemplary processes according to implementations described herein.
Figure 8:
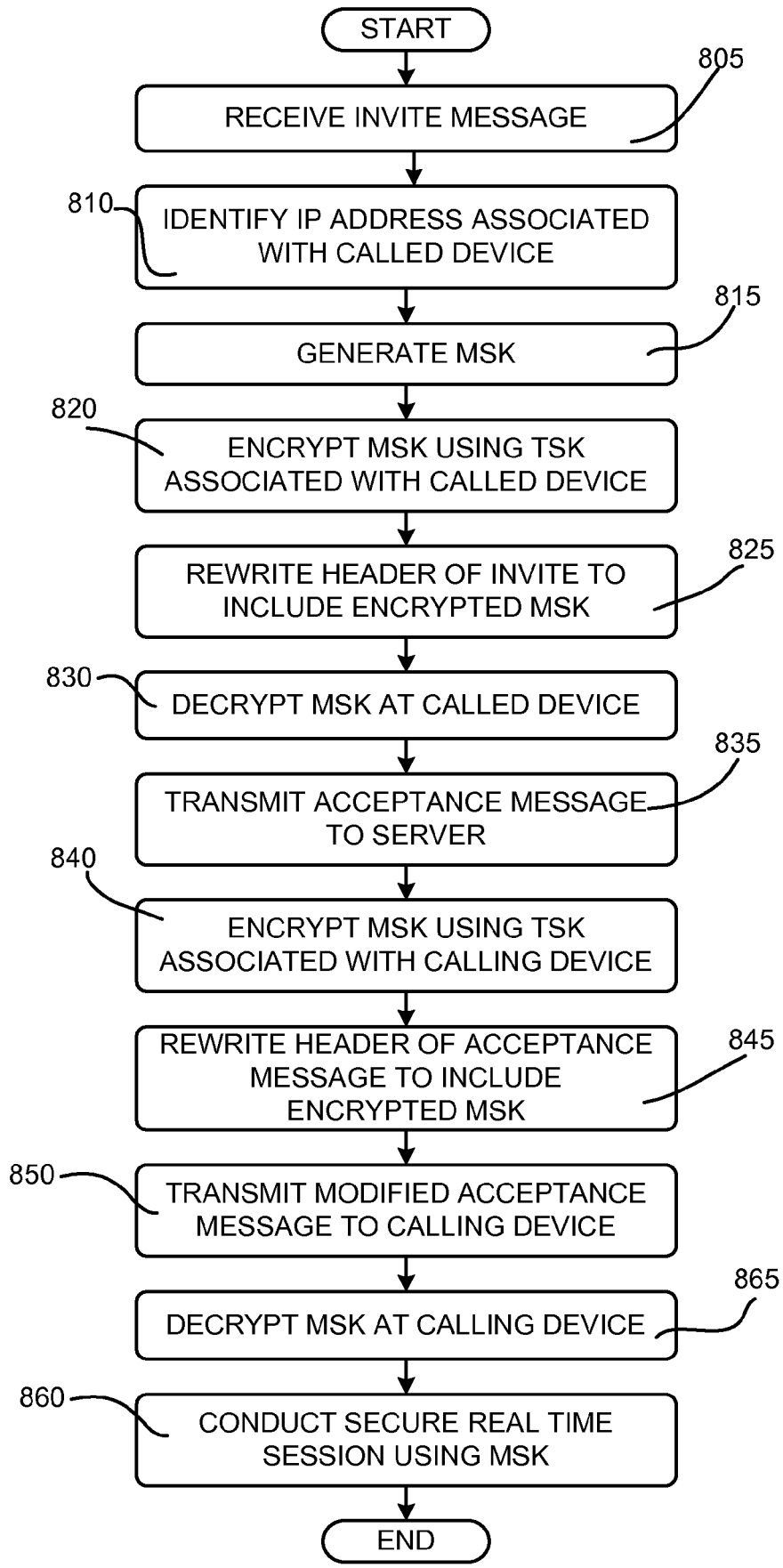

FIGS. 7 and 8 are flowcharts of exemplary processes capable of being performed by devices 110 and registration/proxy server 120, or combinations of aforementioned devices. As shown in FIG. 7, device 110A may transmit a secure registration request to registration/proxy server 120 (block 705). In response, registration/proxy server 120 may transmit a digital certificate including an associated encryption key to device 110A (block 710). In one example, the encryption key may be a public key corresponding to server 120's private key.

Device 110A may verify the authenticity of the received digital certificate (e.g., via a trusted third party) (block 715) and may extract the public key (block 720). Device 110A may generate a key generating value (e.g., a random or pseudo-random number) (block 725). Device 110A may encrypt the generated key generating value (block 730) and may transmit the encrypted key generating value to server 120 (block 735).

Device 110A may generate a temporary session key (TSK) based on the key generating value (block 740). For example, the key generating value may be used as a seed in generating the TSK.

Server 120, upon receipt of the encrypted seed generating value, may decrypt the encrypted key generating value using its private key (block 745) and generate the identical TSK based on the key generating value (block 750). Device 110B may register in a similar manner as described above in relation to device 110A.

As shown in FIG. 8, registration/proxy server 120 may receive an INVITE message (e.g., INVITE message 610) from calling device 110A requesting a secure communication session with called device 110B (block 805). Registration/proxy server 120 may identify an IP address associated with the called device 110B (block 810). Registration/proxy server 120 may generate a master session key (MSK) (block 815) and may encrypt the MSK using the TSK associated with called device 110B (block 820). Registration/proxy server 120 may rewrite a header of the INVITE message to include the IP address of the called device 110B and the encrypted MSK (block 825). Registration/proxy server 120 may transmit the modified INVITE message to called device 110B.

Called device 110B may decrypt the encrypted MSK using its TSK (block 830) and may transmit an acceptance message (e.g., a 200 OK message) to registration/proxy server 120 (block 835). Registration/proxy server 120 may encrypt the MSK using the TSK associated with calling device 110A (block 840). Registration/proxy server 120 may rewrite a header of the acceptance message to include the IP address of the calling device 110A and the encrypted MSK (block 845). Registration/proxy server 120 may transmit the modified acceptance message to calling device 110A (block 850). Calling device 110A may decrypt the encrypted MSK using its TSK (block 855). Calling device 110A and called device 110B may conduct a secure real time communication session (e.g., via SRTP) using the shared MSK provided by registration/proxy server 120 (block 860).

FIG. 9 is an exemplary call flow 900 between calling device 110A, registration/proxy server 120, and called device 110B in an alternative embodiment for establishing a secure communication session between calling device 110A and called device 110B. As shown, registration/proxy server 120 may receive standard registration messages (905 and 915) from devices 110A and 110B, respectively. Registration/proxy server 120 may respond to the registration requests by updating any registrar tables or other information associated with devices 110A and 110B to reflect the information included in messages 905 and 915. Registration/proxy server 120 may transmit 200 OK or other similar acceptance (910 and 920) back to each device 110A and 110B.

Following registration, registration/proxy server 120 may receive an INVITE message 925 from calling device 110A. In accordance with the present embodiment, INVITE message 925 may include a temporary session key (TSK) encrypted with a known public key associated with server 120. In this implementation, server 120 does not independently generate the TSK. Rather, server 120 decrypts the provided TSK using its private key. Similar to the manner described above, registration/proxy server 120 rewrites and forwards the INVITE message 930 to called device 110B. Forwarded INVITE message 930 may designate that the request is for a secure call or session (e.g., by include a predetermined value in a header of INVITE message 930). Called device 110B, upon acceptance of the session invitation, may generate and encrypt its own TSK using the public key associated with server 120. Called device 110B may transmit the encrypted TSK to server 120 in a 200 OK or other suitable acceptance message 935.

Registration/proxy server 120 may decrypt called device 110B's TSK and may generate a master session key (MSK) for use in the secure communication. Registration/proxy server 120 may encrypt the MSK using the TSK associated with device 110A. Server 120 may rewrite the header of 200 OK message 935 to include the encrypted MSK and may transmit the modified 200 OK message 940 to calling device 110A.

Upon receipt of 200 OK message 940, calling device 110A may decrypt the MSK using its TSK and may transmit an ACK message 945 to server 120 indicating that the session acceptance has been received. Server 120 may encrypt the MSK using the TSK associated with called device 110B and may rewrite ACK message 945 to include the encrypted TSK. Registration/proxy server 120 may transmit the modified ACK message 950 to called device 110B. Devices 110A and 110B may now conduct the secure real time media session (955) (e.g., via SRTP), using the MSK provided by server 120 as a shared private encryption/decryption key.

Systems and methods described herein may enable the efficient establishment of secure communication sessions between two or more devices. For example, the systems and methods may securely establish temporary session keys with connected client devices during device registration. The temporary session keys may then be used to encrypt a master session key for use in encrypting and decrypting data in a real time communication session established between the session participants.

Because all distributed keys and keying material are provided in a secure manner, confidence in the established security is high, while the type of communication and participants to the session remain substantially transparent. In addition, because the above-described system and method provide an end-to-end solution, network environments supporting multiple intermediary devices are supported. For example, any number of session border controllers (SBCs) may be used by network operators without impacting the viability of the described system. By including all keying information is standard portions of message headers that are unmodified during traversal of an SBC, each participant device may accurately receive and respond to the keying information.

The foregoing description provides illustration and description, but is not intended to be exhaustive or to limit the embodiments to the precise form disclosed. Modifications and variations are possible in light of the above teachings or may be acquired from practice of the invention.

For example, while series of acts have been described with regard to the flowcharts of FIGS. 7 and 8, the order of the acts may differ in other implementations. Further, non-dependent acts may be performed in parallel. For example, encryption of the MSK for each participating device may be performed substantially simultaneously.

Embodiments, as described above, may be implemented in many different forms of software, firmware, and hardware in the implementations illustrated in the figures. The actual software code or specialized control hardware used to implement embodiments consistent with principles of the invention is not limiting of the invention. Thus, the operation and behavior of the embodiments were described without reference to the specific software code—it being understood that one would be able to design software and control hardware to implement the embodiments based on the description herein.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the present application should be construed as critical or essential to the invention unless explicitly described as such. Also, as used herein, the article "a" is intended to include one or more items. Where only one item is intended, the term "tone" or similar language is used. Further, the phrase "based on" is intended to mean "based, at least in part, on" unless explicitly stated otherwise.

What is claimed is:

1. A method comprising:
   receiving, by a registration device, a register message from a first client device;
   transmitting, by the registration device and in response to the register message, a digital certificate including a public key associated with the registration device to the first client device;
   receiving, by the registration device, a secure session setup message that includes a header that comprises an encrypted key generating value from the first client device,
   wherein the encrypted key generating value is encrypted using the public key associated with the registration device;
   decrypting, by the registration device, the encrypted key generating value using a private key associated with the registration device;
   generating, by the registration device, a temporary session key associated with the first client device based on the key generating value;
   identifying, by the registration device, a first IP address associated with a second client device;
   generating, by the registration device, a second temporary session key associated with the second client device based on a second key generating value received from the second client device;
   receiving, by the registration device, a secure session invitation message from the first client device requesting a secure communication with the second client device;
   identifying, by the registration device, a second IP address associated with the first device;
   generating, by the registration device, a master session key;
   encrypting, by the registration device, the master session key using the second temporary session key associated with the second client device;
   generating, by the registration device, a modified secure session invitation message that includes a header that includes the IP address of the second device and the encrypted master session key;
   transmitting, by the registration device, the encrypted master session key to the second client device, within the modified the secure session invitation message for decrypting by the second client device;
   receiving, by the registration device, an acceptance message from the second client device;
   generating, by the registration device, a modified acceptance message that includes a header that includes the IP address of the first device and the encrypted master session key; and
   transmitting, by the registration device, the encrypted master session key to the first client device within the modified acceptance message.

2. The method of claim 1, wherein the secure session setup message comprises a session initiation protocol (SIP) message.

3. The method of claim 1, wherein the header of the secure session setup message comprises a session description protocol (SDP) header of a session initiation protocol (SIP) message.

4. The method of claim 1, wherein the key generating value received from the first device comprises a random number or a pseudorandom number.

5. A system, comprising:
   a registration/proxy server connected to a first real time communication session device and a second real time communication session device,
   wherein the registration/proxy server is configured to:
      receive a register message from a first real time communication session device;
      transmit, in response to the register message, a digital certificate including a public key associated with the registration device to the first real time communication session device;
      receive a secure session setup message that includes a header that comprises an encrypted first key generating value from the first real time communication session device,
      wherein the encrypted first key generating value is encrypted using the public key associated with the registration/proxy server;
      decrypt the encrypted first key generating value using a private key associated with the registration/proxy server;
      generate a first temporary session key based on the first key generating value;
      identify a first IP address associated with the first real time communication session device;

generate a second temporary session key associated with a second real time communication session device based on a second key generating value received from the second real time communication session device;
identify a second IP address associated with the second real time communication session device;
receive a secure session invitation message from the first real time communication session device requesting a secure communication with the second real time communication session device;
generate a master session key;
encrypt the master session key based on the second temporary session key;
generate a modified secure session invitation message that includes a header that includes the IP address of the second real time communication session device and the encrypted master session key;
transmit the modified secure session invitation message to the second real time communication session device;
receive an acceptance message from the second real time communication session device;
generate a modified acceptance message that includes a header that includes the IP address of the first real time communication session device and the encrypted master session key; and
transmit the encrypted master session key to the first real time communication session device within the modified acceptance message.

6. The system of claim 5, wherein the first real time communication session device is configured to:
transmit the encrypted first key generating value to the registration/proxy server;
generate the first temporary session key based on the first key generating value;
receive the encrypted master session key from the registration/proxy server in the modified acceptance message;
decrypt the encrypted master session key using the first temporary session key; and
conduct a secure real time communication session with the second real time communication session device using the master session key.

7. The system of claim 5, wherein each of the encrypted first key generating value and the encrypted master session key are included in headers of respective session setup messages.

8. The system of claim 5, wherein each of the encrypted first key generating value and the encrypted master session key are included in a session description protocol (SDP) portion of the headers of the respective session setup messages.

9. The system of claim 5, wherein the second real time communication session device is configured to:
transmit the encrypted second key generating value to the registration/proxy server;
generate the second temporary session key based on the second key generating value;
receive the master session key encrypted based on the second temporary session key from the registration/proxy server;
decrypt the encrypted master session key using the second temporary session key; and
conduct the secure real time communication session with the first real time communication session device using the master session key.

* * * * *